United States Patent
Ortel et al.

(10) Patent No.: US 6,505,540 B2
(45) Date of Patent: Jan. 14, 2003

(54) CONTROL VALVE RETAINING ELEMENT

(75) Inventors: Peter Ortel, Lahnstein (DE); Ludwig Friedsam, Oberdürenbach (DE)

(73) Assignee: Lucas Industries plc (GB)

(*) Notice: Subject to any disclaimer, the term of this patent is extended or adjusted under 35 U.S.C. 154(b) by 0 days.

(21) Appl. No.: 09/922,262

(22) Filed: Aug. 3, 2001

(65) Prior Publication Data

US 2001/0052286 A1 Dec. 20, 2001

Related U.S. Application Data

(63) Continuation of application No. PCT/EP00/02497, filed on Mar. 21, 2000.

(30) Foreign Application Priority Data

Mar. 25, 1999 (DE) ................................. 299 05 522 U

(51) Int. Cl.⁷ .............................. F15B 9/10; F15B 21/04
(52) U.S. Cl. ........................................ 91/376 R; 92/78
(58) Field of Search ............................ 91/376 R; 92/78

(56) References Cited

U.S. PATENT DOCUMENTS

| 4,667,567 A | * 5/1987 | Morimoto ................ 91/376 R |
| 5,556,173 A | 9/1996 | Steiner et al. |
| 5,732,556 A | 3/1998 | Schlüter et al. |
| 5,778,754 A | 7/1998 | Kaub |
| 5,826,484 A | * 10/1998 | Gautier et al. ............ 91/376 R |

FOREIGN PATENT DOCUMENTS

| DE | 4408993 C2 | 5/1997 | |
| EP | 790910 B1 | 5/1998 | |
| JP | 154950 | * 8/1985 | ............ 91/376 R |
| WO | WO 96/14230 | 5/1996 | |

* cited by examiner

*Primary Examiner*—F. Daniel Lopez
(74) *Attorney, Agent, or Firm*—MacMillan, Sobanski & Todd, LLC

(57) ABSTRACT

A control valve retaining element (22) for a brake booster (10) has a hollow cylindrical base member (28) and a first retaining collar (30), which is connected to the base member (28) and has at least one side wall for supporting a bellows end (20). To enable such a retaining element to be manufactured less expensively and positioned easily and securely on an actuating rod (16) of a brake booster (10), a second retaining collar (36) extends radially inwards from a first end of the base member (28) and in peripheral direction, wherein the second retaining collar (36) comprises a first lateral face (38) for cooperation with a stop (44) of the actuating rod (16) and a second lateral face (40) lying opposite the first lateral face (38) for cooperation with a compression spring (46).

8 Claims, 2 Drawing Sheets

CONTROL VALVE RETAINING ELEMENT

CROSS REFERENCE TO RELATED APPLICATIONS

This application is a continuation of International Application No. PCT/EP00/02497 filed Mar. 21, 2000, which claims priority to German Patent Application No. 29905522.1 filed Mar. 25, 1999.

BACKGROUND OF THE INVENTION

The invention relates to a control valve retaining element, which is used in a control valve of a brake booster and by means of which a bellows end and optionally an air filter element are accommodated and positioned relative to an actuating rod of the brake booster.

Such a control valve retaining element is used in particular for brake boosters, in which the boosting force results from an air pressure difference within the brake booster. Said brake boosters have, in a housing, two chambers which are separated from one another in a gastight manner by a movable wall. A control valve, which is usually actuable by means of an actuating rod, is used to feed into the one chamber selectively a pressure which is higher in comparison to the other chamber so as to produce at the movable wall a pressure difference, which gives rise to the desired boosting force. To protect the control valve from dust, dirt particles and other environmental influences it is surrounded by bellows, one end of which is fixed to the actuating rod by means of the said retaining element. Brake boosters of the described type mostly take the form of vacuum brake boosters. However, the invention may be used also for brake boosters which operate purely hydraulically.

From EP 0 790 910 B1 a retaining element is known, which is used to accommodate and position the end of a bellows, which protects the control valve of a vacuum brake booster from dirt, on an actuating rod of the control valve. The retaining element is disposed by means of a press fit immovably on the actuating rod and has at its pedal-side end a retaining collar, which accommodates the annular bellows end. Upon a displacement of the actuating rod the retaining element is entrained and, with it, the bellows end accommodated in the retaining collar.

As the retaining element is fastened by means of a press fit on the actuating rod, the manufacturing tolerances between the retaining element and the actuating rod have to be very exacting. This inevitably increases the cost of manufacturing the retaining element. The retaining element is moreover complex to install because it has to be pressed onto the actuating rod and at the same time an exact positioning of the retaining element relative to the actuating rod has to be effected. In the event of loosening of the press fit of the retaining element, the retaining element may shift out of the desired position relative to the actuating rod. The vacuum brake booster known from EP 0 790 910 B1 also has an annular cylindrical air filter element, which is disposed around the actuating rod and retained by a separate insert provided in the control valve housing.

A quite similar retaining element is known from DE 44 08 993 A1.

SUMMARY OF THE INVENTION

The object of the present invention is to provide a retaining element for accommodating and positioning a bellows end relative to an actuating rod in a vacuum brake booster, which retaining element is less expensive to manufacture and may be positioned easily and securely on the actuating rod.

The retaining element according to the invention should preferably also be able to accommodate and position an air filter element.

Like the known retaining element described initially, the control valve retaining element according to the invention for a brake booster comprises a hollow cylindrical base member and a first retaining collar, which is fitted on the base member and has at least one lateral wall for supporting a bellows end.

However, a second retaining collar is additionally provided, which projects radially inwards from a first end of the base member and extends in peripheral direction. The second retaining collar has a first lateral face, which is provided for cooperation with a step-shaped stop of a brake booster actuating rod, and an opposite second lateral face, which is provided for cooperation with a compression spring of the brake booster.

In said manner the control valve retaining element according to the invention may be fitted in a precisely defined position relative to the actuating rod by using a stop, which is already provided on the actuating rod and is acted upon in conventional brake boosters by a compression spring, which resets the actuating rod. The maintaining of said position is guaranteed by the clamping of the control valve retaining element between the compression spring and the stop of the actuating rod, i.e. the compression spring presses the second retaining collar towards the stop. In order further to simplify the manufacture and installation of the control valve retaining element according to the invention, the control valve retaining element according to the invention is preferably of an integral construction.

According to a preferred refinement of the retaining body according to the invention, its base member is provided with a third retaining body, which is used to accommodate an air filter.

By means of said third retaining collar, which preferably extends radially outwards from the base member and in peripheral direction, an e.g. annular air filter may be accommodated and positioned relative to the actuating rod. The number of elements to be assembled is therefore reduced, assembly is simplified and operational reliability increased.

In a further embodiment of the invention, the third retaining collar has an at least substantially S-shaped cross section.

In said manner a sufficiently wide supporting and/or retaining surface extending in peripheral direction is obtained for the air filter element. The third retaining collar is preferably provided at the first end of the base member.

According to a particularly preferred refinement of the control valve retaining element according to the invention, the second retaining collar defines an at least substantially annular opening, the diameter of which corresponds to an outside diameter of the actuating rod. The inside diameter of the base member is in said case preferably greater than the outside diameter of the actuating rod. Thus, during assembly of the brake booster the control valve retaining element according to the invention may easily be slipped onto the actuating rod until the first lateral face of the second retaining collar cooperates with the stop of the actuating rod. This eliminates the need for exact and elaborate positioning such as is necessary e.g. with use of a press fit.

The first retaining collar preferably also extends radially outwards from the base member. Furthermore, the first retaining collar is advantageously provided with two mutually spaced side walls extending parallel to one another for even more secure retention of the bellows end.

Although the control valve retaining element according to the invention may be made of any suitable material, for reasons of manufacture and cost it is preferably made of plastics material.

DETAILED DESCRIPTION OF THE INVENTION

Figure 1:
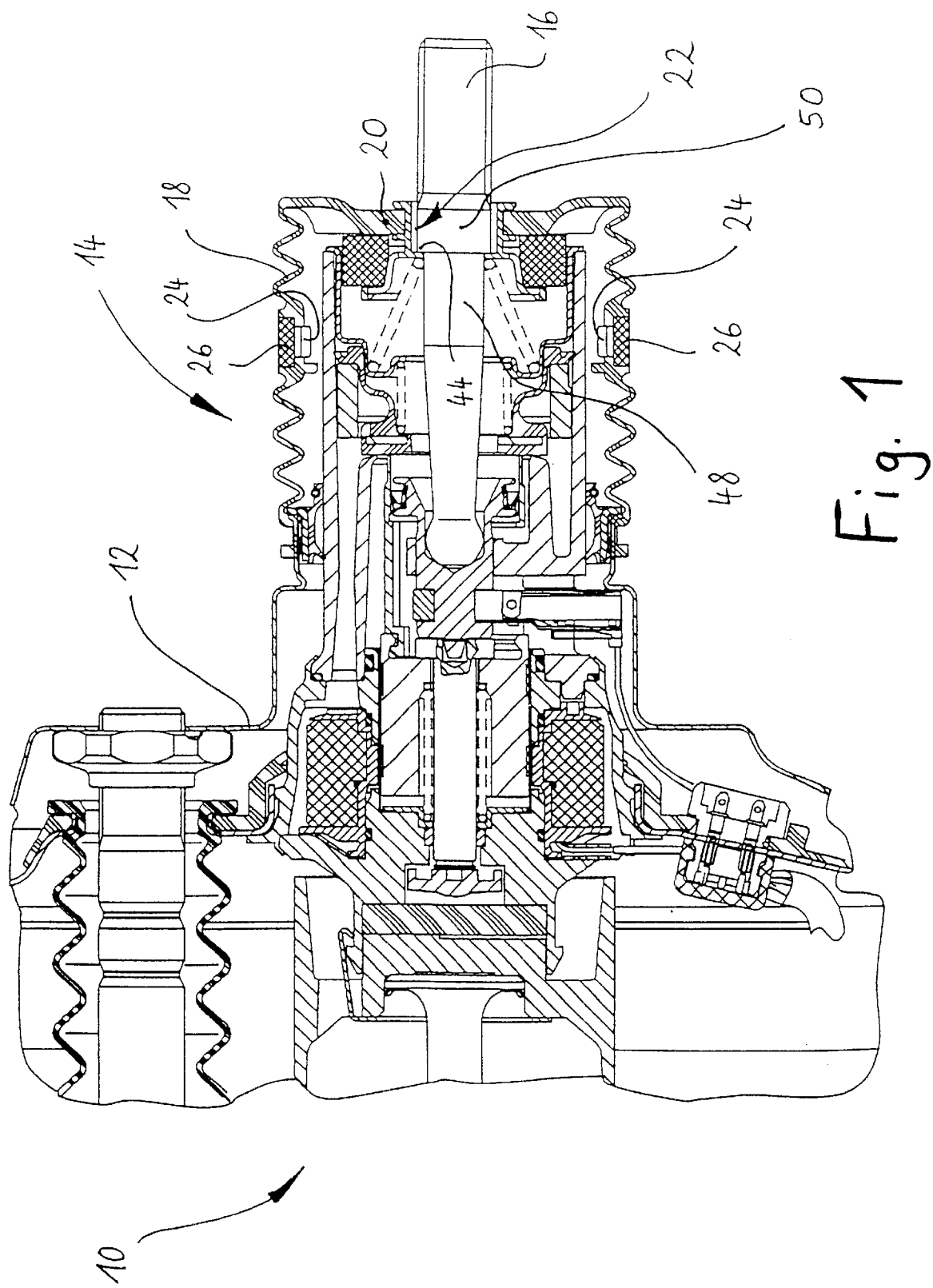
FIG. 1 the relevant part of a brake booster with the control valve retaining element according to the invention in longitudinal section, and FIG. 2 an enlarged view of the region from FIG. 1 containing the control valve retaining element according to the invention.

FIG. 1 shows the relevant part of a vacuum brake booster 10 having a housing 12, into which projects a control valve 14 which may be actuated by means of an actuating rod 16. The control valve 14 is surrounded by bellows 18, one end of which is fastened to a tubular extension of the brake booster housing 12 and the other bead-shaped end 20 of which is supported against a control valve retaining element 22, by means of which said end 20 is fastened to the actuating rod 16. The bellows 18 protects the control valve 14 from external influences, e.g. dust and small dirt particles, and comprises a plurality of ambient air inlets 24, which are arranged so as to be distributed in peripheral direction and each of which is provided with a filter 26.

Figure 2:
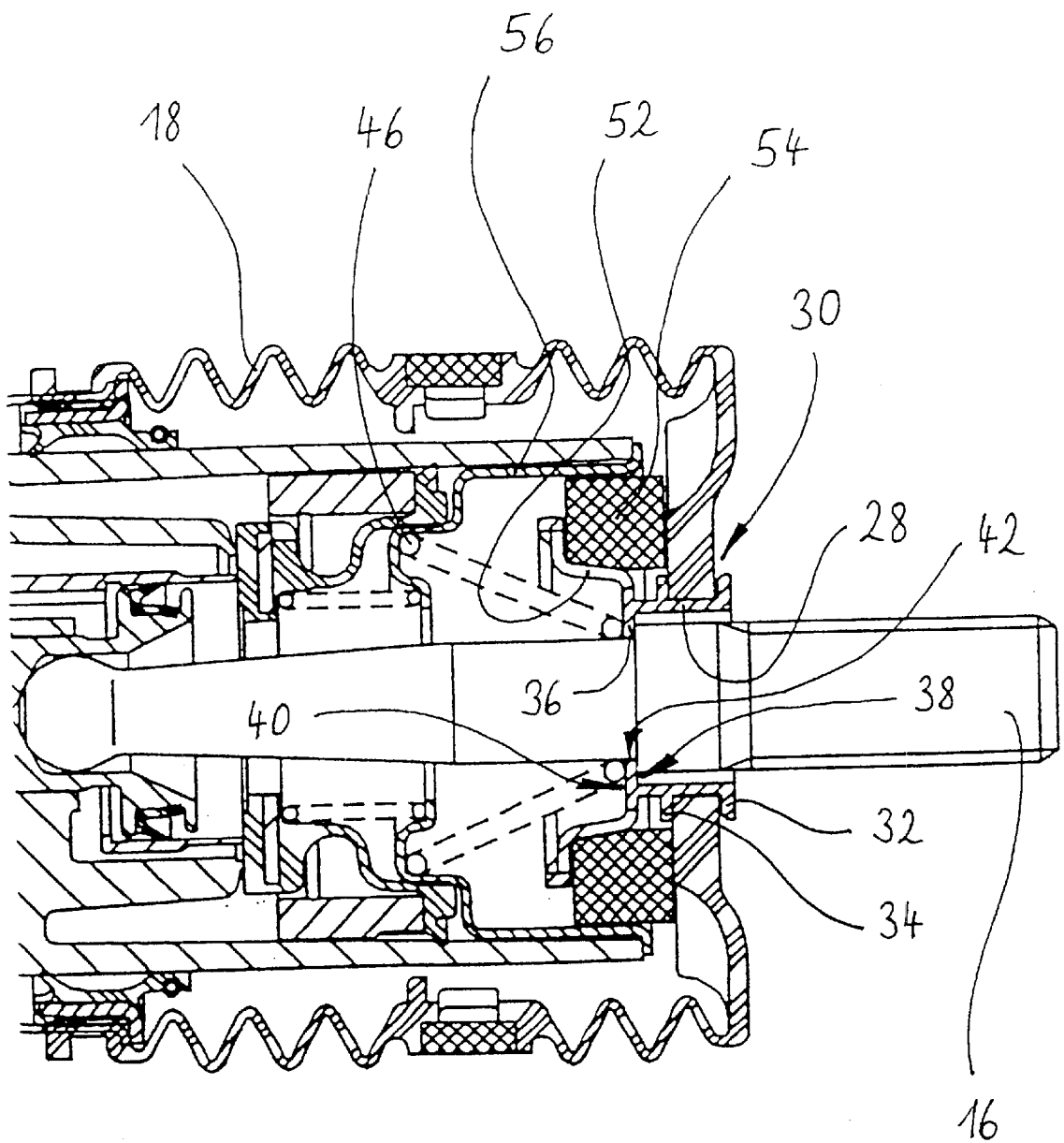

As is more clearly evident from FIG. 2, the control valve retaining element 22 comprises a hollow cylindrical base member 28 and a first retaining collar 30 integrally connected thereto. The first retaining collar 30 serves to support, accommodate and position the bellows end 20 and is formed here by two side walls 32 and 34, which are axially spaced apart from one another and extend parallel in a radially outward direction and in peripheral direction of the base member 28, and by a part of the peripheral surface of the base member 28.

At a first end of the base member 28 facing the control valve 14, a second retaining collar 36 extending radially inwards and in peripheral direction is formed likewise integrally with the base member 28 and comprises a first lateral face 38 and a second lateral face 40. The second retaining collar 36 defines a, here, annular opening 42, which allows the actuating rod 16 to pass through the control valve retaining element 22. In the assembled state, the first lateral face 38 cooperates with a stop 44 of the actuating rod 16, towards which stop the control valve retaining element 22 is pressed by a compression spring 46 which resets the actuating rod 16. In the illustrated embodiment, the stop 44 is formed by a step between regions of differing diameter 48 and 50 of the actuating rod 16.

During assembly of the control valve 14 the control valve retaining element 22 is fitted on the actuating rod 16 in such a way that the first lateral face 38 of the second retaining collar 36 comes into contact with the stop 44. The compression spring 46 may then act upon the second lateral face 40 of the second retaining collar 36, with the result that the control valve retaining element 22 is clamped between the stop 44 and the compression spring 46 and positioned in a defined manner relative to the actuating rod 16. The refinement of the second retaining collar 36 and the stop 44 described here is to be understood as being merely by way of example since various refinements of the second retaining collar 36 and the stop 44 are possible, so long as it is guaranteed that a first lateral face cooperates with the stop 44 and a second lateral face cooperates with the compression spring 46 in such a way that the control valve retaining element 22 is held in a defined position relative to the actuating rod 16.

The control valve retaining element 22 moreover comprises a third retaining collar 52, which in the illustrated embodiment extends at the first end of the base member 28 radially outwards relative to the second retaining collar 36 and in peripheral direction. The third retaining collar 52 is constructed integrally with the base member 28 and shaped in such a way that it may support and position a bulky air filter element 54 in the control valve 14. To said end, as FIG. 2 reveals, the third retaining collar 52 has a substantially S-shaped cross section so that the annular, axially extending air filter element 54 is adequately embraced.

In the illustrated embodiment, the air filter element 54 is supported axially, on the one hand, against the radially directed side wall of the third retaining collar 52 and, on the other hand, at its opposite side against the inside of the bellows end 20 thickened in a bead-shaped manner. The air filter element 54 is accordingly, as it were, clamped axially between the bellows end 20 and the third retaining collar 52. Radially, the air filter element 54 is supported at its inside against the third retaining collar 52 and at its outside against an insert 56, which is provided in the housing of the control valve 14 and also serves as an abutment for the compression spring 46.

According to a further embodiment not illustrated here, the third retaining collar 52, which in the previous embodiment has only one side wall extending substantially in a radially outward direction, may alternatively have two side walls spaced axially apart from one another and extending radially outwards. The air filter element is then accommodated between said two side walls and is not, as in the embodiment illustrated in the drawings, supported against the inside of the bellows end 20 thickened in a bead-shaped manner.

In all embodiments, in order to guarantee easy fitting of the control valve retaining element 22 on the actuating rod 16, the inside diameter of the base member 28 is preferably slightly greater than the maximum outside diameter (here of the region 50) of the actuating rod 16, over which the control valve retaining element 22 is to be slipped. Thus, the control valve retaining element 22 may easily be slipped onto the actuating rod 16 until the first lateral face 38 of the second retaining collar 36 comes into contact with the stop 44. The second retaining collar 36 with its, here, circular opening 42 defines an inside diameter, which is smaller compared to the base member 28, and hence provides for a guidance of the entire control valve retaining element 22 on the actuating rod 16. In the illustrated embodiment the diameter of the opening 42 of the second retaining collar 36 corresponds, apart from the usual tolerances, to the outside diameter of the region 48 of the actuating rod 16.

The control valve retaining element 22 simplifies the construction and reduces the manufacturing costs of a brake booster because fitting of a bulky air filter element no longer requires a separate part. Instead, the air filter element 54 is fitted in a simple manner in the control valve 14 in that it is slipped together with the control valve retaining element 22 onto the actuating rod 16 and held by the latter in a desired position.

Although the control valve retaining element 22 according to the invention is described and illustrated here as an integral body, it may alternatively be formed from individual components. For example, the retaining collars 30, 36 and 52 may be separate parts which are subsequently connected to the base member 28, e.g. by means of a detent connection. The control valve retaining element 22 is advantageously made of plastics material, thereby enabling its inexpensive production e.g. as an injection-moulded part.

What is claimed is:

1. Control valve retaining element for a brake booster for accommodating and positioning a bellows end relative to an actuating rod, comprising:

a hollow cylindrical base member, and a first retaining collar, which is connected to the base member and has at least one side wall that extends radially outwards from the base member for supporting a radially extending bellows end, wherein a second retaining collar extends radially inwards from and integral with a first end of the base member and in peripheral direction, the second retaining collar comprising a first lateral face for cooperation with a stop of an actuating rod and a second lateral face opposite the first lateral face for cooperation with a compression spring.

2. Control valve retaining element according to claim 1, wherein connected to the base member is a third retaining collar, which is designed so as to accommodate an air filter element.

3. Control valve retaining element according to claim 2, wherein the third retaining collar extends radially outwards and in peripheral direction.

4. Control valve retaining element according to claim 2, wherein the third retaining collar has a substantially S-shaped cross section.

5. Control valve retaining element according to claim 2, wherein the third retaining collar extends from the first end of the base member.

6. Control valve retaining element according to claim 1, wherein the second retaining collar defines an at least substantially circular opening of a diameter which corresponds to an outside diameter of the actuating rod, and that the inside diameter of the base member is greater than the outside diameter of the actuating rod.

7. Control valve retaining element according to claim 1, wherein the control valve retaining element is made of plastics material and is of an integral construction.

8. Control valve retaining element according to claim 1, the first retaining collar comprises two side walls, which are spaced apart from one another and extend parallel to one another.

* * * * *